United States Patent [19]

Matsuura et al.

[11] Patent Number: 5,696,042

[45] Date of Patent: Dec. 9, 1997

[54] CERAMIC POROUS BODY AND METHOD FOR PREPARING THE SAME

[75] Inventors: Takahiro Matsuura; Chihiro Kawai; Akira Yamakawa, all of Itami, Japan

[73] Assignee: Sumitomo Electric Industries, Ltd., Japan

[21] Appl. No.: 531,668

[22] Filed: Sep. 21, 1995

[30] Foreign Application Priority Data

Nov. 8, 1994 [JP] Japan .................................. 6-273796

[51] Int. Cl.$^6$ ......................... C04B 38/00; C04B 35/584
[52] U.S. Cl. ................... 501/97.1; 501/80; 501/87; 501/92; 501/97.1; 501/97.2; 501/97.3; 501/97.4; 264/43; 264/65
[58] Field of Search ...................... 501/80, 97, 87, 501/92, 97.1, 97.2, 97.3, 97.4; 264/65, 43

[56] References Cited

U.S. PATENT DOCUMENTS

| | | | |
|---|---|---|---|
| 4,043,823 | 8/1977 | Washburn et al. | 501/80 |
| 4,629,707 | 12/1986 | Wolfe | 501/97 |
| 4,650,592 | 3/1987 | Dobbs et al. | 501/97 |
| 4,777,152 | 10/1988 | Tsukada . | |
| 5,200,373 | 4/1993 | Yasutomi et al. . | |

FOREIGN PATENT DOCUMENTS

| | | |
|---|---|---|
| 653392 | 5/1995 | European Pat. Off. . |
| 8700305 | 8/1987 | France . |
| 38 35 807 | 5/1989 | Germany . |
| 38 39 701 | 7/1989 | Germany . |
| 41 26 510 | 2/1993 | Germany . |
| 19207 | 5/1977 | Japan . |
| 153871 | 6/1990 | Japan . |
| 159970 | 7/1991 | Japan . |

*Primary Examiner*—Karl Group
*Attorney, Agent, or Firm*—Bierman, Muserlian and Lucas LLP

[57] ABSTRACT

A ceramic porous body for a filter or a catalyst carrier, having a structure in which voids each having the same volume as that of a sphere of 10 μm to 500 μm in diameter are formed and the voids are communicated with each other through smaller fine pores, the ceramic porous body having a volume fraction of the voids and the fine pores of from 15% to 60% and being formed of components 70% or higher by volume of which is silicon nitride. The ceramic porous body is prepared by mixing coarse silicon nitride powder with fine silicon nitride powder(s) at a mixing ratio by volume of the fine silicon nitride powder to the combined volume of the fine and coarse silicon nitride powders in the range of 1/99 to 1/2; adding one or more compounds of the group IIa elements, the group IIIa elements, transition metals, Al and Si in a range of 1% to 30% by volume as their oxides to the silicon nitride powder mixture; molding the resultant powder mixture; and sintering the molded body in a non-oxidizing atmosphere of at least 0.9 atm at a temperature ranging from 1100° C. to 2000° C.

12 Claims, 2 Drawing Sheets

VOID    10 μm

VOID  10μm

CERAMIC POROUS BODY AND METHOD FOR PREPARING THE SAME

BACKGROUND OF THE INVENTION

1. Field of the Invention

The present invention relates to a silicon nitride ceramic porous body utilized in a filter for high temperature gas such as an exhausted gas filter for an automobile and an exhausted gas filter used in a thermal power plant, and the silicon nitride ceramic porous body utilized as a carrier for a catalyst (i.e., a catalyst carrier) used for a catalytic combustion in a thermal power plant. The present invention further relates to a method for preparing such a silicon nitride ceramic porous body.

2. Description of the Prior Art

As disclosed in Japanese Patent Laid-open No. 2-153871, oxide ceramics composed mainly of alumina has been prepared as a ceramic porous body. In pharmaceutical chemistry and food industries, for example, filters made of ceramic porous bodies are utilized for removing fungi and the like. Compared with competitive organic filters, the filters made of a ceramic porous body are advantageous in that a sterilizing treatment can be given through high temperature vapor and high pressure can be applied to the filters and so on. The ceramic porous body is also used in the preparation of ultra-pure water for cleaning in connection with semiconductor, and also used as a filter for removing dust in a clean room.

In addition to the filters, cordierite having excellent thermal shock resistance is utilized as catalyst carrier for purging exhausted gas from automobiles. The cordierite is for treating oxynitride in exhausted gas by catalyst such as platinum carried on the surface. The cordierite is also used in a chemical plant as a catalyst carrier to treat harmful substances which otherwise may be a cause of environmental pollution.

The ceramic porous body has been developed and expected to find the above-mentioned applications, but its limitation has been clarified. For filtering high temperature water at a temperature of at least 300° C., for example, there occurs serious thermal shock which causes cracks and damages in the filter made of alumina having high coefficient of thermal expansion. Thus, the ceramic porous body cannot be used at such a high temperature.

In filtering gas, which is attained through its collision and adhesion to the surface of the filter material, when fine pores are connected in a three-dimensional network state as in the prior-art filter, the filtered remainder tends to be trapped inside the filter material.

For removing graphite particulate matter exhausted from Diesel engines, which is paid attention to these days, the ceramic porous body is considered to be used at the temperature from 800° C. to 1400° C. However, the cordierite now used as exhausted gas filter cannot endure at such a high temperature.

In connection with the environmental problems, a catalyst for lowering the combustion temperature has been considered in order to reduce $NO_x$ from a thermal power plant. As a catalyst carrier, a ceramic porous body that does not shrink even at a high temperature range of from 1000° C. to 1400° C., is needed. The cordierite, alumina and the like currently commercially prepared cannot be used at such a high temperature range.

Japanese Laid-open No. 3-159970 discloses a silicon nitride porous body having high thermal resistance and thermal shock resistance. According to this method, grains of silicon nitride or silicon carbide as aggregates are bound to each other through grain boundaries formed through atmospheric pressure sintering. Furthermore, in Japanese Patent Publication No. 52-19207, a silicon nitride porous body is prepared through direct nitriding of metal silicon. The silicon nitride porous bodies prepared by these methods have excellent thermal resistance and thermal shock resistance, and can be used under the conditions at which the oxide ceramic porous body cannot be used.

However, since in the silicon nitride porous body made by the above methods, silicon nitride crystal grains are bound by binders or the porous body is prepared by necking the grains, the strength of the porous body is lowered. When utilizing the porous body as a filter for liquid or gas, the filter may be damaged during filtering or backwashing. Furthermore, it is difficult to control the structure of the porous body to be most suitable for a catalyst carrier. Since only the gaps between the grains serve as fine pores, the porosity of the filter is small and thus the filter is easily clogged when the concentration of the liquid or gas to be filtered is high.

Further, since the structure of the porous body is depends mostly on the particle size of the raw material powder, it is difficult to arrange the structure of the porous body to be suited for various desired applications.

SUMMARY OF THE INVENTION

The present invention is directed to provide a ceramic porous body made of silicon nitride free from the above-mentioned problems and, more specifically, a silicon nitride ceramic porous body which is highly strong and can be used as a gas filter and a catalyst carrier hardly clogged.

According to the present invention, there is a ceramic porous body having a structure in which voids each having the same volume as that of a sphere of 10 μm to 500 μm in diameter are formed and the voids are communicated with each other through smaller fine pores, the ceramic porous body having a volume fraction of the voids and the fine pores of from 15% to 60% and being formed of components 70% or higher by volume of which is silicon nitride.

The ceramic body is provided by a production process comprising:

mixing β-type silicon nitride powder with amorphous silicon nitride powder having an average particle size smaller than that of the β-type silicon nitride powder, the mixing ratio of the volume of said amorphous silicon nitride powder to the combined volume of said amorphous silicon nitride powder and β-silicon nitride powder being from 1/99 to 1/2;

adding, as an additive, at least one selected from the group consisting of compounds of the group IIa elements, the group IIIa elements in the Periodic Table, transition metals, Al and Si in a range of from 1% to 30% by volume in total as their oxides based on the whole volume of the resultant powder mixture;

molding the powder mixture; and sintering the molded body in a non-oxidizing atmosphere of at least 0.9 atm at a temperature ranging from 1100° C. to 2000° C.

In the above production process, α-silicon nitride powder having an average particle size smaller than that of the β-type silicon nitride powder may also be used in place of the amorphous silicon nitride powder and sintering is performed at a temperature of 1300° C. to 1900° C.

Further, a powder mixture consisting of α-type silicon nitride powder and amorphous silicon nitride powder having an average particle size smaller than that of the α-type silicon nitride powder may be used in the same mixing ratio by volume as that of the above β-type and amorphous silicon nitride powders and sintering is performed at a temperature of 1100° C. to 1700° C.

In a still further production process, the above powder mixture of coarse silicon nitride powder and finer silicon nitride powder used in the above production may be replaced with the following powder mixture (1) or (2):

Powder mixture (1) prepared mixing β-type silicon nitride powder having an average particle size in the range of from 0.01μ to 1 μm with amorphous silicon nitride powder or α-type silicon nitride powder, both having the same average particle size range as that of the β-type silicon nitride powder, at a mixing ratio by volume of β-type silicon nitride powder:amorphous silicon nitride powder or α-type silicon nitride powder in the range between 1:9 and 9:1, and mixing the resultant fine powder mixture with β-type silicon nitride powder having an average particle size of 1 to 100 μm, the mixing ratio of the volume of the fine powder mixture to the combined volume of the fine powder mixture and the coarse β-type silicon nitride powder being from 1/99 to 1/2.

Powder mixture 2) prepared by mixing two kinds of powders selected from the group consisting of β-type silicon nitride powder, α-type silicon nitride powder and amorphous silicon nitride powder, all having an average particle size in the range of from 0.01 μm to 1 μm, at a mixing ratio by volume of 1:9 to 9:1 and mixing the resultant finer powder mixture with α-type silicon nitride powder having an average particle size of 1 to 100 μm, the mixing ratio by volume of the fine powder mixture to the combined volume of the fine powder mixture and the coarse β-type silicon nitride powder being from 1/99 to 1/2.

When the above powder mixture 1) or 2) is used, sintering is performed in a non-oxidizing atmosphere such as a nitrogen atmosphere of from 0.9 atm to 10 atm at a temperature of from 1100° C. to 2000° C. for the powder mixture 1) or at a temperature of from 1100° C. to 1700° C. for the powder mixture 1).

DETAILED DESCRIPTION OF THE PREFERRED EMBODIMENTS

Figure 1:
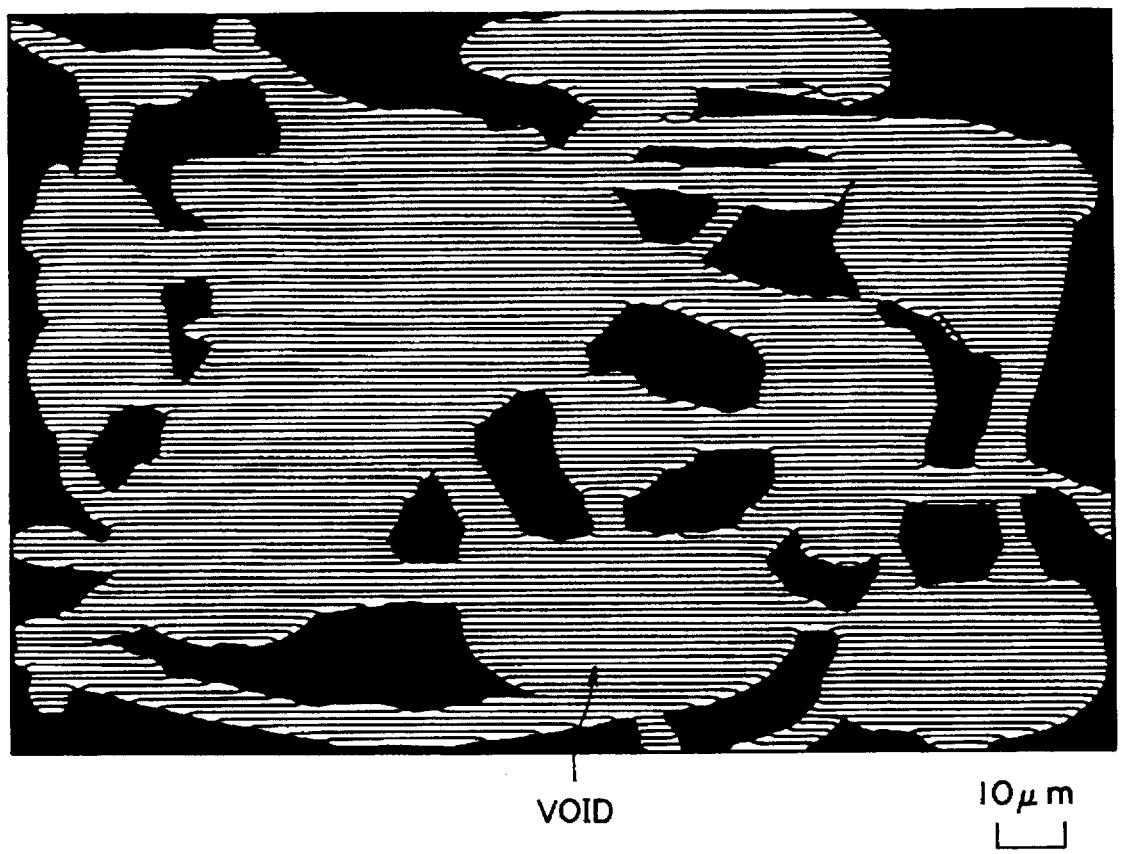
FIG. 1 is an illustration of the section of a silicon nitride ceramic porous body for a filter.

The silicon nitride porous body of the present invention can be used as a gas filter and a catalyst carrier by selecting the appropriate type of powder and controlling the amount thereof depending on the intended application.

The present invention utilizes the difference in the reaction temperature between each type of the silicon nitride powder and each additive. For example, when a press body to which 5% by volume of yttrium oxide and 2% by volume of aluminum oxide are added is formed and the reactivity between these additives and the respective types of silicon nitride powder materials is examined, the temperature range at which the shrinkage starts is: β-type silicon nitride>α-type silicon nitride>amorphous silicon nitride. Utilizing this phenomenon, when shrinkage unevenly occurs from the state where the powder are molded, the distance between the shrunk portion and the other portion can be enlarged. That is, it has been found as a result of inventors's detailed experimental investigation that larger voids are formed by the combination of voids as well as the sintering of the powder. Such a non-uniform reaction can be appropriately controlled by the size and the type (β, α or amorphous) of the used silicon nitride powder, and, as a result, a porous body having a structure in which silicon nitride grains are connected to each other can be formed. Furthermore, the voids are enlarged to form voids having larger volume, besides the communicating voids forming fine pores, inside the porous body. When these larger pores exist, the filtered impurity can be trapped therein, and a filter difficult to be clogged can be prepared.

Furthermore, the number of peaks of the fine pore distribution can be increased by adding powder which is fine and difficult to react with the additives in order to obtain a catalyst carrier having the most suited structure.

The method for preparing the above-mentioned porous body is now described.

First, two or more types of powders are selected from α-type, β-type, and amorphous silicon nitride raw material powder having various average particle sizes, and the mixing ratio is adjusted.

At this stage, the combination of the types of the raw material powders (α, β or amorphous) and the particle sizes are adjusted according to the diameter at the peak and the peak number desired in the fine pore distribution of the porous body to be prepared. That is, since the temperature of reaction between each silicon nitride and the fine pore forming agent is different, shrinkage by sintering unevenly occurs inside the molded body. Thus, a porous body having a desired form can be prepared.

The patterns of the combination is as follows:

|     | Coarse particle powder | Fine particle powder |
| --- | --- | --- |
| (1) | β-silicon nitride powder + | amorphous silicon nitride powder |
| (2) | β-silicon nitride powder + | α-silicon nitride powder |
| (3) | α-silicon nitride powder + | amorphous silicon nitride powder |

When (1) and (2) are used, amorphous silicon nitride powder or α-silicon nitride powder, which reacts with the additive at a lower temperature than the temperature of the reaction between β-silicon nitride powder and the additive, is mixed in such a proportion that the ratio of the volume of the fine amorphous silicon nitride powder or α-silicon nitride powder to the combined volume of the powder mixture of the coarse β-silicon nitride powder and the finer amorphous or α-silicon nitride powder is 1/99 to 1/2. In the case of (3), amorphous silicon nitride powder, which reacts with the additive at a temperature lower than the temperature of the reaction between α-silicon nitride powder and the additive, is mixed in such a proportion that the ratio of the volume of the amorphous silicon nitride powder is from 1/99 to 1/2 with respect to the whole volume of the powder mixture of the amorphous and α-silicon nitride powder. When the mixing ratio is less than 1/99, the mass transfer becomes difficult to occur and the desired structure cannot be obtained. When the mixing ratio is more than 1/2, overall shrinkage proceeds instead of the formation of voids if the heating temperature is high. Thus, the desired structure cannot be obtained and the porosity becomes less than 15% by volume. When the heating temperature is low, the porosity is too large due to bulkiness of the powder.

When the porous body is used as a catalyst carrier, the fine particle powder, which reacts with the additive at a temperature almost equal to the reaction temperature between the large particle powder and the additive, is mixed in order to form a minimum peak in the fine pore distribution. The combination is:

|     | Coarse particle powder | Fine particle powder |
| --- | --- | --- |
| (1) | β-silicon nitride powder + | (amorphous silicon nitride powder + β-silicon nitride powder) |
| (2) | β-silicon nitride powder + | (α-silicon nitride powder + β-silicon nitride powder) |
| (3) | α-silicon nitride powder + | (amorphous silicon nitride powder + β-silicon nitride powder) |
| (4) | α-silicon nitride powder + | (amorphous silicon nitride powder + α-silicon nitride powder) |
| (5) | α-silicon nitride powder + | (α-silicon nitride powder + β-silicon nitride powder) |

In each combination, two kinds of fine particle powders (particle size: from 0.1 μm to 1.0 μm) are mixed at a ratio by volume in the range between 1:9 and 9:1. When the mixing ratio is outside the range, the effect of adding the fine particle powders is not obtained and the fine pore distribution measured by a mercury porosimeter has only one peak. Concerning the mixing ratio of the coarse particle powder and fine particle powders, the fine particle powder is required to be mixed with the coarse particle powder in a such a proportion that the ratio by volume of the fine particle powder mixture to the combined volume of the fine particle powder and the coarse particle powder ranges from 1/99 to 1/2, for the same reason as described above.

Powder which is difficult to react with the additive may be used in place of the fine β-silicon nitride powder in such an amount that the total of the powder and the additive is not greater than 30% by volume. The examples are BN, $B_4C$, TiN, TiC and the like having high melting point and the average particle size of from 0.01 μm to 1.0 μm.

The additive is added to the above silicon nitride powder mixture. The average particle size of the coarse powder is preferably from 1.0 μm to 100 μm. When the size is smaller than 1.0 μm, the porosity is too large due to bulkiness of the powder. When it is larger than 100 μm, the necessary strength cannot be obtained because of insufficient sinterability in some cases.

After molding, the additive-added powder mixture is heated in a non-oxidizing atmosphere, such as nitrogen, argon, a mixed gas of nitrogen and argon, etc., at a pressure of not less than 0.9 atm. When the pressure is lower than 0.9 atm, the silicon nitride evaporates during heating, the strength is lowered. When the finer powder is composed of a single type of silicon nitride, there is no specific upper limit for the pressure. For example, even when the porous body is heated under 1000 atm, the formation of fine pores is not affected since the same pressure is applied to the inside of the fine pores. However, the porous body is preferably heated in the non-oxidizing atmosphere under a pressure of 10 atm or less since applying high pressure will increase the production cost. However, when the finer powder is composed of two types of silicon nitride, the pressure should be within the range of 0.9 atm to 10 atm for the desired properties and the cost reduction.

The heating temperature ranges from 1100° C. to 2000° C. for sintering. The upper and lower limits of the heating temperature will vary according to the kind of the used material powders. Concerning each of the temperature ranges, the fine pore formation does not proceed and the necessary morphology of the fine pores, porosity and strength cannot be fully obtained when the heating temperature is lower than the temperature range. When the temperature is higher than the range, the mass transfer is excessively promoted and the necessary volume fraction of voids cannot be obtained due to an excess sintering.

As fine pore forming agents added, there may be mentioned compounds of group IIa elements, group IIIa elements, transition metals, Al and Si. These additives are needed to be added in the range between 1% by volume and 30% by volume, in total, calculated as their oxides. Throughout the specification and claims, the amount of the additives is indicated in their total amount calculated as oxides based on the whole volume of the powder mixture to be formed into a ceramic porous body, unless otherwise specified. When the amount of the additives is less than 1% by volume, the mass transfer which forms the desired voids does not occur. When the amount of additives is more than 30% by volume, a fused vitreous phase remains inside the porous body, thereby lowering the thermal resistance and thermal shock resistance. Further, the strength is also inevitably lowered due to the formation of large amount of oxynitride.

When α-type silicon nitride material powder is used as a main component, the heating temperature is needed to be equal to or lower than 1700° C. When the temperature is higher than 1700° C. (particularly equal to or higher than 1800° C.), β-columnar grains are formed by the α-to-β phase transformation. The columnar grains tend to extend in the direction where there are no obstacles, during formation, and thus the desired form of the voids cannot be obtained.

Ceramic porous bodies which are excellent in thermal resistance and thermal shock resistance and can be suitably used as a gas filter and a catalyst carrier can be obtained by the above-described steps.

At least 70% by volume of the silicon nitride ceramic porous body prepared by the above method is constructed with silicon nitride grains. When the fine pores of the porous body are subjected to mercury-porosimetry measurements, one or more peaks are recognized in the fine pore distribution. When there is one peak, voids each having the same volume as that of a sphere having a diameter of from 10 μm to 500 μm are formed inside the porous body and are communicated through the smaller continuous pores. When there are two or more peaks, the fine pores formed from the fine grains are found in addition to the void structures formed in the one-peak fine pore distribution.

The size and number of the voids can be controlled by the average particle size of the mixed silicon nitride powders and the mixing ratio. Concerning the number of the voids, it is requested that sections of at least fifty voids (preferably at least 100 voids) each having a diameter ranging from 10 μm to 500 μm exist in a unit area (1 $cm^2$) of any cross-section of the resultant porous ceramic body. When a porous body having such voids is used for filtering gas, the voids effectively trap the matter to be filtered (dust and the like) which collide against the inside wall of the voids. If the number is under 50, the desired effect cannot be attained.

When there are two or more peaks in the fine pore distribution, the particulate matter to be filtered is separated and removed through the fine pores smaller than the matter when the porous body is used as filter. However, if there exists a peak at a smaller fine pore diameter than that of the foregoing fine pores, resistance occurs thereon and the filtering efficiency is lowered. Thus, the number of the peaks is desired to be one.

However, when the porous body is used as a catalyst carrier, the number of peaks is desired to be two or more. The reason is that gas or liquid entering through larger fine pores can be treated by the catalyst at smaller fine pores since the concentration of the catalyst becomes high in the smaller fine pores. In this case, the fine pore diameter at the minimum peak is more preferably 1.0 μm or less for the use as a catalyst carrier.

The term "peak" used in the present invention means a peak which can be clearly judged from the fine pore distribution (dV/dr, V: fine pore volume, r: fine pore diameter) obtained by mercury-porosimetry measurements, and does not mean all of the peaks which can be obtained by mathematical operation such as waveform separation. Concerning the mercury-porosimetry measurements, the results measured by AUTOSCAN-60 POROSIMETER made by Qanta Chrome Corporation are set to be standard. When there are plural peaks in the fine pore distribution, a peak at a pore diameter smaller than that of any other peak is referred to as "minimum peak" in this specification.

As for strength, the three point flexural strength is required to be at least 20 MPa. If the strength is lower than 20 MPa, the porous body cannot endure water pressure or gas pressure when it is used as a filter or a catalyst carrier. The strength will change in accordance with the width of the fine pore distribution. This width changes according to the type and amount of the used material powder and the type and amount of the fine pore forming agent. Even if the structure shown in the present invention is obtained, the strength is lower than 20 MPa in some cases when the width is large.

In the above-described two types of silicon nitride ceramic porous bodies, the volume fraction of the voids and the fine pores (porosity) is from 15% to 60%. If the porosity is less than 15%, pressure loss is large when the matter to be treated is filtered and the enough treating speed cannot be attained. When the porosity is more than 60%, the required strength cannot be attained. When the porous body is used as a filter or a catalyst carrier, the porosity is preferably from 30% to 50%. The voids are dispersed well inside of the porous body especially within this range, and a highly efficient filter and a catalyst carrier can be expected.

Since at least 70% by volume of the material is composed of silicon nitride, the porous body can be used at high temperatures. The porous body can be also used with being exposed to abrupt heat cycle due to its excellent thermal shock resistance.

In obtaining the above-described porous body structure, any desired structure can be prepared by controlling the type of the used raw material powder (α, β and amorphous silicon nitride, and carbides or nitrides of B, Si, Ti, Zr, W and Hf), the particle size and the combination thereof, the amount of the additives, and the heating condition in accordance with the selected combination.

As having the above characteristics, the silicon nitride ceramic porous body is useful as a stock which can fully solve the above-mentioned problem.

Examples of the present invention will be now described.

Example of silicon nitride porous bodies for filters:

EXAMPLE 1

β-silicon nitride powders having average particle sizes of 4.0 μm and 40 μm and amorphous silicon nitride powders having average particle sizes of 0.1 μm and 1.0 μm were combined and mixed. 6% by volume of $Y_2O_3$ and 2% by volume of $Al_2O_3$ as fine pore forming accelerators were added to each powder mixture. After molding, the accelerator-added powder mixture was sintered under 4 atm in a nitrogen atmosphere at 1800° C. for two hours.

The properties of the sintered body are shown in Table 1. FIG. 1 is the illustration of the section of the typical sintered body. FIG. 1 shows that voids having a size of at least than 10 μm were distributed and were communicated with each other through continuous fine pores.

Figure 2:
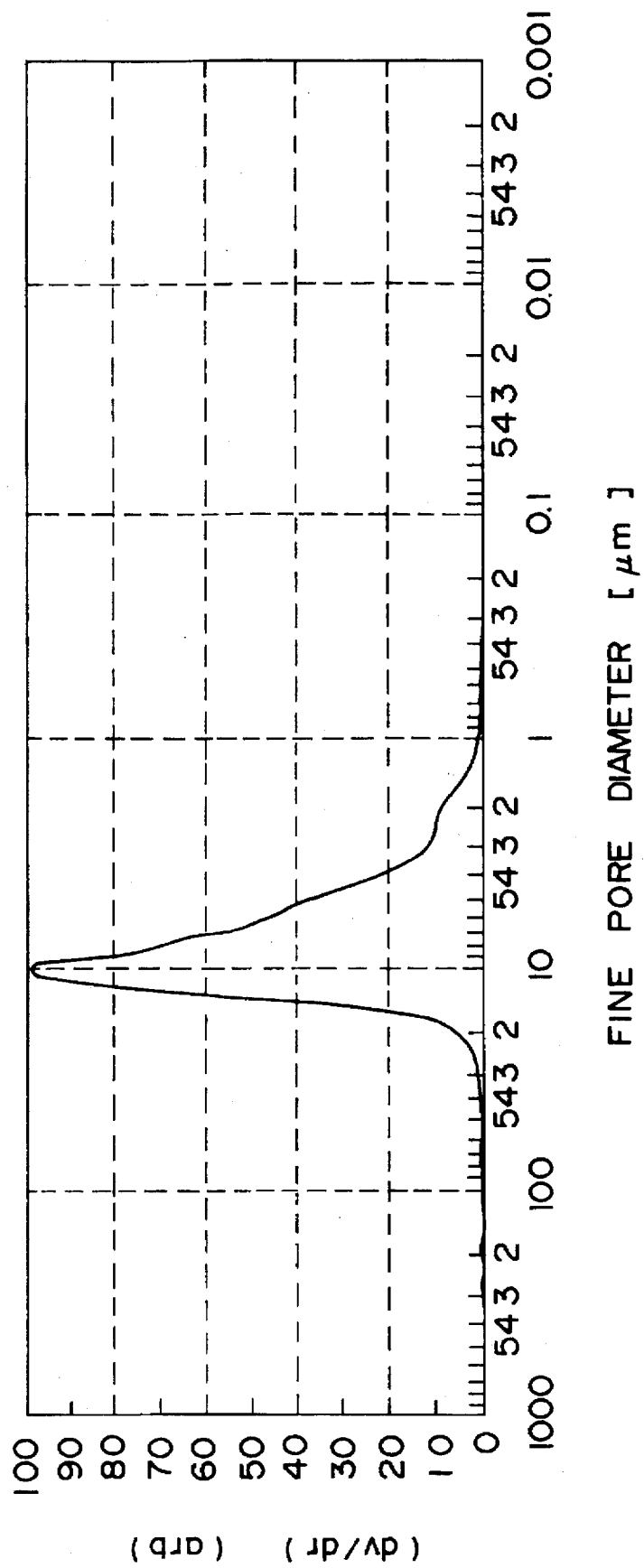
FIG. 2 is a graph showing the distribution of fine pores of a silicon nitride ceramic porous body for a filter by mercury-porosimetry measurements.

FIG. 2 shows the fine pore distribution of the fine pores of the above sample measured by a mercury porosimeter. Comparative samples were made under the same conditions using β-silicon nitride powders having average particle sizes of 0.08 μm and 100 μm and amorphous silicon nitride powders having average sizes of 0.06 μm and 106 μm. The results of the comparative samples are shown in Table 1.

The numbers of the sections of the voids having a diameter of from 10 μm to 500 μm in a unit area (1 $cm^2$) of at the section of each sample were measured. The results are shown in Table 1.

In example 2 and later examples, when the number of the void sections in the unit section area of 1 $cm^2$ of each sample was less than 50, the sign (x) was shown in the columnar "structure". When the number of the voids in the unit sectional area was at least 50, the sign was (o). The peak(s) in the fine pore distribution was (were) shown only in number.

Samples 1 and 2 were for comparison when the coarse particle powder was mixed with the powder having the particle size larger than the former powder. In this case, the number of the peak in the fine pore distribution was one, and the number of the voids at the section was less than 50. These samples were not in the necessary range in porosity and strength. In sample 23, the particle size of the coarse particle powder was not larger than 1.0 μm, and the porosity was over 60%. The diameter of the fine pores of this sample was small, and the number of the voids having a diameter of 10 μm to 500 μm at the section was less than 50.

When the mixing ratio was not in the range of the present invention as in samples 3 and 7, two peaks appeared, or the numbers of the voids at the section was less than 50.

TABLE 1

| | β-type powder | | Amorphous powder | | Properties | | | |
|---|---|---|---|---|---|---|---|---|
| Sample No. | Particle size (μm) | Amount (vol. %) | Particle size (μm) | Amount (vol. %) | Strength (MPa) | Porosity (%) | Diameter at peak (μm) | Number of sections of voids |
| 1 | 100 | 60 | 106 | 32 | 11 | 20 | 20.1 | 39 |
| 2 | 40 | 60 | 106 | 32 | 48 | 12 | 18.5 | 25 |

TABLE 1-continued

| Sample No. | β-type powder Particle size (μm) | Amount (vol. %) | Amorphous powder Particle size (μm) | Amount (vol. %) | Properties Strength (MPa) | Porosity (%) | Diameter at peak (μm) | Number of sections of voids |
|---|---|---|---|---|---|---|---|---|
| 3 | 40 | 40 | 1 | 52 | 57 | 27 | 20.3/5.3 | 48 |
| 4 | 40 | 60 | 1 | 32 | 41 | 36 | 15.6 | 61 |
| 5 | 40 | 70 | 1 | 22 | 36 | 31 | 13.7 | 82 |
| 6 | 40 | 80 | 1 | 12 | 23 | 25 | 10.1 | 73 |
| 7 | 40 | 91.5 | 1 | 0.5 | 45 | 30 | 7.6 | 40 |
| 8 | 40 | 40 | 0.1 | 52 | 61 | 28 | 12.3/3.5 | 33 |
| 9 | 40 | 60 | 0.1 | 32 | 35 | 45 | 10.8 | 59 |
| 10 | 40 | 70 | 0.1 | 22 | 31 | 40 | 9.9 | 67 |
| 11 | 40 | 80 | 0.1 | 12 | 25 | 32 | 8.6 | 61 |
| 12 | 40 | 91.5 | 0.1 | 0.5 | 63 | 30 | 5.4 | 11 |
| 13 | 4 | 40 | 1 | 52 | 47 | 24 | 6.7/1.6 | 9 |
| 14 | 4 | 60 | 1 | 32 | 66 | 45 | 8.4 | 89 |
| 15 | 4 | 70 | 1 | 22 | 58 | 41 | 7.3 | 103 |
| 16 | 4 | 80 | 1 | 12 | 42 | 35 | 5.9 | 71 |
| 17 | 4 | 91.5 | 1 | 0.5 | 80 | 41 | 5.6 | 21 |
| 18 | 4 | 40 | 0.1 | 52 | 81 | 44 | 5.9/1.2 | 14 |
| 19 | 4 | 60 | 0.1 | 32 | 72 | 50 | 4.3 | 126 |
| 20 | 4 | 70 | 0.1 | 22 | 68 | 42 | 3.9 | 92 |
| 21 | 4 | 80 | 0.1 | 12 | 47 | 38 | 3.2 | 74 |
| 22 | 4 | 91.5 | 0.1 | 0.5 | 91 | 46 | 2.8 | 27 |
| 23 | 0.08 | 60 | 0.06 | 32 | 112 | 62 | 0.3 | 12 |

EXAMPLE 2

β-silicon nitride powder having an average size of 40 μm and amorphous silicon nitride powder having an average size of 1.0 μm were mixed at the ratio of 15:8. One or more additives of $Y_2O_3$, $Al_2O_3$, MgO, $TiO_2$ and $SiO_2$ were added to the silicon nitride powder mixture with changing amount of the additives. After molding, each additive-added powder mixture was sintered under 4 atm in a nitrogen atmosphere at 1800° C. for two hours.

The properties of the sintered body were shown in Table 2. In the samples to which the additives of less than 1.0% by volume were added, mass transfer does not occur during sintering. The powders were sintered to each other only by necking, and thus the strength was less than 20 MPa. When the additives of more than 30% by volume were added, sintering and mass transfer excessively occurred and the porosity was less than 15%. There remains a fused vitreous phase inside of the porous body. The strength was inevitably lowered because of the formation of a large amount of oxynitride.

EXAMPLE 3

60% by volume of β-silicon nitride powder having an average particle size of 40 μm and 32% by volume of amorphous silicon nitride powder having an average size of 1.0 μm were mixed with each other. 6% by volume of $Y_2O_3$ and 2% by volume of $Al_2O_3$ as additives were added to the powder mixture. The additive-added powder mixture was sintered under the various conditions of nitrogen pressure, temperature and sintering temperature. The properties of the sintered body are shown in Table 3.

TABLE 3

| Sample No. | Heating Pressure (atm) | temperature (°C.) | Properties Strength (MPa) | Porosity (%) | Number of peak | Structure |
|---|---|---|---|---|---|---|
| 1 | 0.85 | 1800 | 18 | 65 | 2 | x |
| 2 | 1 | 1800 | 24 | 30 | 1 | o |
| 3 | 4 | 1800 | 41 | 36 | 1 | o |

TABLE 2

| Sample No. | Additive Kind | Amount (vol. %) | Kind | Amount (vol. %) | Properties Strength (MPa) | Porosity (%) | Number of peak | Structure |
|---|---|---|---|---|---|---|---|---|
| 1 | $Y_2O_3$ | 0.1 | — | — | 15 | 63 | 2 | x |
| 2 | $Y_2O_3$ | 1 | — | — | 23 | 48 | 1 | o |
| 3 | $Y_2O_3$ | 6 | — | — | 42 | 45 | 1 | o |
| 4 | $Y_2O_3$ | 10 | — | — | 41 | 34 | 1 | o |
| 5 | $Y_2O_3$ | 30 | — | — | 35 | 29 | 1 | o |
| 6 | $Y_2O_3$ | 35 | — | — | 13 | 12 | 1 | x |
| 7 | $Al_2O_3$ | 6 | — | — | 20.5 | 34 | 1 | o |
| 8 | MgO | 6 | — | — | 45 | 26 | 1 | o |
| 9 | $TiO_2$ | 6 | — | — | 75 | 45 | 1 | o |
| 10 | $SiO_2$ | 6 | — | — | 36 | 36 | 1 | o |
| 11 | $Y_2O_3$ | 6 | $Al_2O_3$ | 2 | 41 | 36 | 1 | o |
| 12 | $Y_2O_3$ | 6 | $TiO_2$ | 2 | 81 | 30 | 1 | o |

Note: Sample Nos. 1 and 6 are comparative samples.

TABLE 3-continued

| | Heating | | Properties | | | |
|---|---|---|---|---|---|---|
| Sample No. | Pressure (atm) | temperature (°C.) | Strength (MPa) | Porosity (%) | Number of peak | Structure |
| 4 | 10 | 1800 | 43 | 25 | 1 | o |
| 5 | 4 | 1000 | 6 | 66 | 2 | x |
| 6 | 4 | 1200 | 34 | 46 | 1 | o |
| 7 | 4 | 1600 | 45 | 41 | 1 | o |
| 8 | 8 | 2000 | 57 | 21 | 1 | o |
| 9 | 15 | 2100 | 71 | 5 | 1 | x |

Note: Sample Nos. 1, 5 and 9 are comparative samples.

When the nitrogen pressure was lower than 0.9 atm, the porosity was more than 60% due to the evaporation, or the evaporation-condensation of silicon nitride.

When the sintering temperature was lower than 1100° C., since the silicon nitride particles were in contact with each other only by necking, the strength was lower than 20 MPa. When the sintering temperature was higher than 2000° C., the sintering excessively proceeded and the porosity became less than 15%.

EXAMPLE 4

β-silicon nitride powders having particle sizes of 4.0 μm and 40 μm and α silicon nitride powders having average particle sizes of 0.1 μm and 1.0 μm were combined and mixed. 6% by volume of $Y_2O_3$ and 2% by volume of $Al_2O_3$ as additives were added to each powder mixture. After molding, each additive-added powder mixture was sintered under 4 atm in a nitrogen atmosphere at 1750° C. for two hours. The properties of each sintered body are shown in Table 4.

TABLE 4

| | β-type powder | | α-type powder | | Properties | | | |
|---|---|---|---|---|---|---|---|---|
| Sample No. | Particle size (μm) | Amount (vol. %) | Particle size (μm) | Amount (vol. %) | Strength (MPa) | Porosity (%) | Number of peak | Structure |
| 1 | 40 | 40 | 1 | 52 | 67 | 21 | 2 | x |
| 2 | 40 | 60 | 1 | 32 | 49 | 34 | 1 | o |
| 3 | 40 | 70 | 1 | 22 | 35 | 28 | 1 | o |
| 4 | 40 | 80 | 1 | 12 | 26 | 20 | 1 | o |
| 5 | 40 | 91.5 | 1 | 0.5 | 64 | 36 | 1 | x |
| 6 | 40 | 40 | 0.1 | 52 | 59 | 34 | 2 | x |
| 7 | 40 | 60 | 0.1 | 32 | 42 | 41 | 1 | o |
| 8 | 40 | 70 | 0.1 | 22 | 36 | 38 | 1 | o |
| 9 | 40 | 80 | 0.1 | 12 | 71 | 41 | 1 | o |
| 10 | 40 | 91.5 | 0.1 | 0.5 | 41 | 36 | 1 | x |
| 11 | 4 | 40 | 1 | 52 | 49 | 19 | 2 | x |
| 12 | 4 | 60 | 1 | 32 | 72 | 40 | 1 | o |
| 13 | 4 | 70 | 1 | 22 | 63 | 35 | 1 | o |
| 14 | 4 | 80 | 1 | 12 | 51 | 31 | 1 | o |
| 15 | 4 | 91.5 | 1 | 0.5 | 91 | 44 | 1 | x |
| 16 | 4 | 40 | 0.1 | 52 | 88 | 39 | 2 | x |
| 17 | 4 | 60 | 0.1 | 32 | 81 | 46 | 1 | o |
| 18 | 4 | 70 | 0.1 | 22 | 62 | 37 | 1 | o |
| 19 | 4 | 80 | 0.1 | 12 | 57 | 34 | 1 | o |
| 20 | 4 | 91.5 | 0.1 | 0.5 | 102 | 42 | 1 | x |

Note: Sample Nos. 1, 5, 6, 10, 11, 15, 16 and 20 are comparative samples.

When the mixing ratio was out of the range of the present invention, two peaks appeared or the number of the sections was less than 50. Such sample could not satisfy the necessary properties in strength and porosity.

EXAMPLE 5

60% by volume of β-silicon nitride powder having an average size of 40 μm and 32% by volume of α-silicon nitride powder having an average size of 1.0 μm were mixed. 6% by volume of $Y_2O_3$ and 2% by volume of $Al_2O_3$ as fine pore forming agents were added to the powder mixture. After molding, the powder mixture was sintered under the various conditions of nitrogen pressure, temperature and sintering time. Table 5 shows the properties of the porous body thus prepared.

TABLE 5

| | Heating | | Properties | | | |
|---|---|---|---|---|---|---|
| Sample No. | Pressure (atm) | temperature (°C.) | Strength (MPa) | Porosity (%) | Number of peak | Structure |
| 1 | 0.85 | 1750 | 11 | 62 | 2 | x |
| 2 | 1 | 1750 | 21 | 30 | 1 | o |
| 3 | 4 | 1750 | 49 | 34 | 1 | o |
| 4 | 10 | 1750 | 51 | 29 | 1 | o |
| 5 | 4 | 1200 | 16 | 63 | 2 | x |
| 6 | 4 | 1300 | 36 | 42 | 1 | o |
| 7 | 4 | 1500 | 44 | 35 | 1 | o |
| 8 | 8 | 1900 | 61 | 16 | 1 | o |
| 9 | 15 | 2000 | 92 | 9 | 1 | x |

Note: Sample Nos. 1, 5 and 9 are comparative samples.

When the nitrogen pressure was lower than 0.9 atm, the silicon nitride evaporated and the porosity was more than 60%. When the sintering temperature was lower than 1300° C., the silicon nitride particles were in contact with each other only by necking. Thus, the strength was less than 20 MPa. When the sintering temperature was higher than 1900° C., the porosity was less than 15% because the sintering excessively proceeded.

EXAMPLE 6

α-silicon nitride powder having average particle sizes of 5.0 μm and 35 μm and amorphous silicon nitride powders having an average particle sizes of 0.1 μm and 1.0 μm were combined and mixed. Further, 6% by volume of $Y_2O_3$ and 2% by volume of $Al_2O_3$ as additives were added to each powder mixture. After molding, the additive-added powder mixture was sintered under 4 atm in a nitrogen atmosphere at 1600° C. for two hours. Table 6 shows the properties of each sintered body thus obtained.

When the sintering temperature was lower than 1100° C., since the silicon nitride powder were brought into contact with each other only by necking, the strength was smaller than 20 MPa. When sintering temperature was higher than 1700° C., the porosity was smaller than 15% because of excessive sintering. When β-columnar particles were

TABLE 6

| Sample No. | α-type powder | | Amorphous | | Properties | | | |
|---|---|---|---|---|---|---|---|---|
| | Particle size (μm) | Amount (vol. %) | Particle size (μm) | Amount (vol. %) | Strength (MPa) | Porosity (%) | Number of peak | Structure |
| 1 | 35 | 40 | 1 | 52 | 72 | 22 | 2 | x |
| 2 | 35 | 60 | 1 | 32 | 58 | 34 | 1 | o |
| 3 | 35 | 70 | 1 | 22 | 61 | 39 | 1 | o |
| 4 | 35 | 80 | 1 | 12 | 44 | 31 | 1 | o |
| 5 | 35 | 91.5 | 1 | 0.5 | 73 | 28 | 1 | x |
| 6 | 35 | 40 | 0.1 | 52 | 55 | 53 | 2 | x |
| 7 | 35 | 60 | 0.1 | 32 | 77 | 46 | 1 | o |
| 8 | 35 | 70 | 0.1 | 22 | 64 | 43 | 1 | o |
| 9 | 35 | 80 | 0.1 | 12 | 58 | 39 | 1 | o |
| 10 | 35 | 91.5 | 0.1 | 0.5 | 63 | 29 | 1 | x |
| 11 | 5 | 40 | 1 | 52 | 37 | 26 | 2 | x |
| 12 | 5 | 60 | 1 | 32 | 83 | 71 | 1 | o |
| 13 | 5 | 70 | 1 | 22 | 77 | 61 | 1 | o |
| 14 | 5 | 80 | 1 | 12 | 62 | 48 | 1 | o |
| 15 | 5 | 91.5 | 1 | 0.5 | 101 | 25 | 1 | x |
| 16 | 5 | 40 | 0.1 | 52 | 112 | 51 | 2 | x |
| 17 | 5 | 60 | 0.1 | 32 | 151 | 50 | 1 | o |
| 18 | 5 | 70 | 0.1 | 22 | 109 | 42 | 1 | o |
| 19 | 5 | 80 | 0.1 | 12 | 71 | 38 | 1 | o |
| 20 | 5 | 91.5 | 0.1 | 0.5 | 65 | 46 | 1 | x |

Note: Sample Nos. 1, 5, 6, 10, 11, 15, 16 and 20 are comparative samples.

When the mixing ratio fell outside the range of the present invention, two peaks appeared or the number of the sections was less than 50. Such sample could not satisfy the necessary properties in strength and porosity.

EXAMPLE 7

α-silicon nitride powder having an average particle size of 35 μm and amorphous silicon nitride powder having an average particle size of 1.0 μm were combined and mixed. Further, 6% by volume of $Y_2O_3$ and 2% by volume of $Al_2O_3$ as additives were mixed with the powder mixture. After molding, the additive-added powder mixture was sintered under the various conditions of nitrogen pressure, temperature and sintering time. Table 7 shows the properties of each porous body thus prepared.

TABLE 7

| Sample No. | Pressure (atm) | Heating temperature (°C.) | Properties | | | |
|---|---|---|---|---|---|---|
| | | | Strength (MPa) | Porosity (%) | Number of peak | Structure |
| 1 | 0.85 | 1600 | 12 | 67 | 2 | x |
| 2 | 1 | 1600 | 47 | 32 | 1 | o |
| 3 | 4 | 1600 | 61 | 41 | 1 | o |
| 4 | 10 | 1600 | 83 | 28 | 1 | o |
| 5 | 4 | 1000 | 13 | 61 | 2 | x |
| 6 | 4 | 1100 | 77 | 58 | 1 | o |
| 7 | 4 | 1400 | 59 | 47 | 1 | o |
| 8 | 4 | 1700 | 95 | 19 | 1 | o |
| 9 | 10 | 1800 | 103 | 6 | 1 | x |

Note: Sample Nos. 1, 5 and 9 are comparative samples.

When nitrogen pressure was lower than 0.9 atm, the porosity was more than 60% due to the evaporation, or evaporation-condensation of silicon nitride.

formed by phase transformation, the β columnar particles grew in the voids and cut the voids into pieces. Thus, the dust trap effect during filtering cannot be attained.

EXAMPLE 8

In connection with sample No. 4 prepared in Example 1, the three-point flexural strength was measured within the temperature range shown below. The following results were obtained:

| Room Temperature | 41.0 MPa |
|---|---|
| 100° C. | 40.5 MPa |
| 400° C. | 37.7 MPa |
| 800° C. | 25.5 MPa |
| 1100° C. | 21.3 MPa |

From the results, it was known that the sample 4 had a strength of at least 20 MPa at a temperature of 1100° C. or less.

EXAMPLE 9

As to sample 4 in Example 1, it was heated at each temperature of 1100° C. or less, and quenched in the water. No cracks or damages or the like were found after the test even in the sample heated at the temperature of 1100° C. As comparison, the same test was practiced using an alumina porous body (35% porosity). The result was that many cracks and in some cases even damages were found in the comparative sample heated at a temperature of not lower than 300° C.

Examples of silicon nitride porous bodies as catalyst carriers:

EXAMPLE 10

20% by volume of amorphous silicon nitride powder having an average particle size of 0.6 μm, 20% by volume of β-type silicon nitride powder having an average particle size of 0.6 μm, and 53% by volume of β-type silicon nitride powder having an average size of 45 μm were mixed. 5% by volume of yttrium oxide and 2% by volume of aluminum oxide were added to the silicon nitride powder mixture. After molding, the molded body was heated under the various temperatures and nitrogen pressures. The properties of the samples are shown in Table 8.

TABLE 8

| Sample No. | Heating Pressure (atm) | Heating temperature (°C.) | Strength (MPa) | Porosity (%) | Number of peak | Structure |
|---|---|---|---|---|---|---|
| 1 | 0.85 | 1800 | 12 | 60 | 1 | x |
| 2 | 1 | 1800 | 45 | 33 | 2 | o |
| 3 | 4 | 1800 | 81 | 35 | 2 | o |
| 4 | 10 | 1800 | 101 | 21 | 2 | o |
| 5 | 11 | 1800 | 33 | 65 | 1 | x |
| 6 | 4 | 1000 | 65 | 69 | 2 | x |
| 7 | 4 | 1100 | 41 | 54 | 3 | o |
| 8 | 4 | 1400 | 57 | 38 | 3 | o |
| 9 | 4 | 1800 | 81 | 35 | 2 | o |
| 10 | 10 | 2100 | 241 | 4 | 1 | x |
| 11 | 4 | 1800 | 41 | 48 | 2 | o |
| 12 | 4 | 1800 | 36 | 52 | 2 | o |
| 13 | 4 | 1800 | 29 | 36 | 2 | o |
| 14 | 4 | 1800 | 33 | 42 | 2 | o |

Note:
Sample Nos. 11 through 14 used BN, $B_4C$, TiC and TiN, respectively, instead of fine particle β-silicon nitride powder.
Sample Nos. 1, 5, 6 and 10 are comparative samples.

Other porous bodies were prepared using BN, $B_4C$, TiC and TiN, respectively, which have an average particle size of 0.6 μm, instead of adding 20% by volume of β-type silicon nitride powder having an average particle size of 0.6 μm. The properties of those porous bodies are shown in Table 8. Also in cases using those powders, the resultant porous bodies having the same structure could be obtained.

The diameters at the peaks of the sample Nos. 3 and 8 in Table 8 were as follows:

Sample 3 12.9 μm, 0.02 μm
Sample 8 24.3 μm, 1.5 μm, 0.015 μm

EXAMPLE 11

20% volume of amorphous silicon nitride powder having an average particle size of 0.6 μm, 20% by volume of β-type silicon nitride powder having an average particle size of 0.6 μm, and 53% by volume of α-type silicon nitride powder having the average particle size of 21 μm were mixed. 5% by volume of yttrium oxide and 2% by volume of aluminum oxide were added to the silicon nitride powder mixture. After molding, the resultant molded body was heated at each temperature and nitrogen pressure. The properties of the heated samples are shown in Table 9.

TABLE 9

| Sample No. | Heating Pressure (atm) | Heating temperature (°C.) | Strength (MPa) | Porosity (%) | Number of peak | Structure |
|---|---|---|---|---|---|---|
| 1 | 0.85 | 1700 | 16 | 63 | 1 | x |
| 2 | 1 | 1700 | 51 | 38 | 2 | o |
| 3 | 4 | 1700 | 57 | 48 | 2 | o |
| 4 | 10 | 1700 | 71 | 36 | 2 | o |
| 5 | 11 | 1700 | 75 | 21 | 1 | x |
| 6 | 4 | 1000 | 31 | 66 | 2 | x |
| 7 | 4 | 1100 | 66 | 55 | 2 | o |
| 8 | 4 | 1400 | 46 | 39 | 2 | o |
| 9 | 4 | 1800 | 119 | 13 | 1 | x |
| 10 | 10 | 1900 | 130 | 6 | 1 | x |

Note: Sample Nos. 1, 4, 5, 6, 9 and 10 are comparative samples.

When the applied pressure was lower than 0.9 atm, the porosity was more than 60% due to evaporation, or evaporation-condensation of silicon nitride. When the sintering temperature was lower than 1100° C., since connection between the silicon nitride particles was made only by necking, the strength was smaller than 20 MPa. When the sintering temperature was higher than 1700° C., the porosity was less than 15% because the sintering excessively proceeded. When β-columnar particles were formed by phase transformation, the β-columnar particles grow in the voids and cut the voids into pieces. Thus, the porosity was lowered and only one peak was formed.

EXAMPLE 12

β-silicon nitride powders (average particle sizes: 40 μm and 0.6 μm), α-silicon nitride powders (average particle sizes: 35 μm and 0.6 μm), and amorphous silicon nitride powder (average particle size: 0.6 μm) were combined. Yttrium oxide (5% by volume) and aluminum oxide (2% by volume) were added to each of the combined powder mixture. Each powder mixture was heated at the respective temperatures. The results are shown in Tables 10 through 13. The heating conditions were mentioned in each of the tables.

When the mixing ratio fell outside the range of the present invention, only one peak was found or the number of the sections was less than 50. Such samples could not satisfy the necessary properties in strength and porosity in some cases.

TABLE 10

| Sample Nos. | Coarse particle powder β (vol. %) | Fine particle powder 1 amorphous (vol. %) | Fine particle powder 2 β (vol. %) | Strength (MPa) | Porosity (%) | Number of peak | Structure |
|---|---|---|---|---|---|---|---|
| 1 | 40 | 26 | 26 | 36 | 12 | 1 | o |
| 2 | 60 | 16 | 16 | 23 | 25 | 2 | o |
| 3 | 80 | 6 | 6 | 40 | 27 | 2 | o |
| 4 | 91.5 | 0.25 | 0.25 | 43 | 23 | 1 | x |

TABLE 10-continued

| Sample Nos. | Coarse particle powder β (vol. %) | Fine particle powder 1 amorphous (vol. %) | Fine particle powder 2 β (vol. %) | Strength (MPa) | Porosity (%) | Number of peak | Structure |
|---|---|---|---|---|---|---|---|
| 5 | 60 | 3 | 29 | 62 | 14 | 1 | x |
| 6 | 60 | 6 | 26 | 56 | 43 | 2 | o |
| 7 | 60 | 26 | 6 | 37 | 38 | 2 | o |
| 8 | 60 | 29 | 3 | 36 | 29 | 1 | o |

Note: Processing conditions: 1800° C. and 4 atm in nitrogen atmosphere, Heating time: two hours
Sample Nos. 1, 4, 5 and 8 are comparative samples.

TABLE 11

| Sample Nos. | Coarse particle powder β (vol. %) | Fine particle powder 1 α (vol. %) | Fine particle powder 2 β (vol. %) | Strength (MPa) | Porosity (%) | Number of peak | Structure |
|---|---|---|---|---|---|---|---|
| 1 | 40 | 26 | 26 | 35 | 48 | 1 | o |
| 2 | 60 | 16 | 16 | 26 | 20 | 2 | o |
| 3 | 80 | 6 | 6 | 47 | 28 | 2 | o |
| 4 | 91.5 | 0.25 | 0.25 | 64 | 36 | 1 | x |
| 5 | 60 | 3 | 29 | 52 | 33 | 1 | x |
| 6 | 60 | 6 | 26 | 45 | 25 | 2 | o |
| 7 | 60 | 26 | 6 | 32 | 29 | 2 | o |
| 8 | 60 | 29 | 3 | 37 | 30 | 1 | o |

Note: Processing conditions: 1750° C. and 4 atm in nitrogen atmosphere, Heating time: two hours
Sample Nos. 1, 4, 5 and 8 are comparative samples.

TABLE 12

| Sample Nos. | Coarse particle powder α (vol. %) | Fine particle powder 1 amorphous (vol. %) | Fine particle powder 2 β (vol. %) | Strength (MPa) | Porosity (%) | Number of peak | Structure |
|---|---|---|---|---|---|---|---|
| 1 | 40 | 26 | 26 | 12 | 62 | 1 | o |
| 2 | 60 | 16 | 16 | 37 | 32 | 2 | o |
| 3 | 80 | 6 | 6 | 65 | 41 | 2 | o |
| 4 | 91.5 | 0.25 | 0.25 | 92 | 35 | 1 | x |
| 5 | 60 | 3 | 29 | 66 | 31 | 1 | x |
| 6 | 60 | 6 | 26 | 58 | 42 | 2 | o |
| 7 | 60 | 26 | 6 | 42 | 51 | 2 | o |
| 8 | 60 | 29 | 3 | 37 | 42 | 1 | o |

Note: Processing conditions: 1700° C. and 4 atm in nitrogen atmosphere, Heating time: two hours
Sample Nos. 1, 4, 5 and 8 are comparative samples.

TABLE 13

| Sample Nos. | Coarse particle powder α (vol. %) | Fine particle powder 1 amorphous (vol. %) | Fine particle powder 2 α (vol. %) | Strength (MPa) | Porosity (%) | Number of peak | Structure |
|---|---|---|---|---|---|---|---|
| 1 | 40 | 26 | 26 | 12 | 62 | 1 | o |

TABLE 13-continued

| Sample Nos. | Coarse particle powder α (vol. %) | Fine particle powder 1 amorphous (vol. %) | Fine particle powder 2 α (vol. %) | Strength (MPa) | Porosity (%) | Number of peak | Structure |
|---|---|---|---|---|---|---|---|
| 2 | 60 | 16 | 16 | 47 | 29 | 2 | o |
| 3 | 80 | 6 | 6 | 82 | 35 | 2 | o |
| 4 | 91.5 | 0.25 | 0.25 | 101 | 20 | 1 | x |
| 5 | 60 | 3 | 29 | 81 | 21 | 1 | x |
| 6 | 60 | 6 | 26 | 75 | 34 | 2 | o |
| 7 | 60 | 26 | 6 | 52 | 42 | 2 | o |
| 8 | 60 | 29 | 3 | 47 | 35 | 1 | o |

Note: Processing conditions: 1650° C. and 4 atm in nitrogen atmosphere, Heating time: two hours
Sample Nos. 1, 4, 5 and 8 are comparative samples.

As aforementioned, in the silicon nitride ceramic porous body of the present invention, the distribution of the fine pores and the structure can be changed by controlling the type of the material powder and the particle size thereof. As a result, the silicon nitride porous body can be prepared in any forms suitable for the filters or catalyst carriers. Furthermore, since silicon nitride was used as the material of the porous body, it was excellent in thermal shock resistance and thermal resistance. Thus, the silicon nitride porous body can be used in a higher temperature range than the prior-art ceramic porous body, while retaining its high strength.

What is claimed is:

1. A ceramic porous body having a structure containing voids, each having the same volume as that of a sphere of 10 μm to 500 μm in diameter said voids communicating with each other through smaller fine pores, a volume fraction of said voids and said fine pores being from 15 to 60% based on the entire volume of the ceramic porous body, said ceramic porous body being formed of at least three components including a coarse component of silicon nitride, a fine component and an additive, said coarse component having an average particle size larger than said fine component and such that said ceramic porous body comprises 70% or higher by volume of silicon nitride.

2. A ceramic porous body as claimed in claim 1, wherein said ceramic porous body has a three-point flexural strength of at least 20 MPa.

3. A ceramic porous body as claimed in claim 1, wherein said ceramic porous body has, in a unit area of 1 cm² of any cross-section thereof, at least fifty sections of voids each having a diameter ranging from 10 μm to 500 μm, when converted by volume into a sphere.

4. A ceramic porous body as claimed in claim 1, wherein said ceramic porous body exhibits one peak in fine pore distribution dV/dr, wherein V: fine pore volume and r: fine pore diameter, obtained by mercury-porosimetry measurements with AUTOSCAN-60 POROSIMETER made by Quanta Chrome Corporation.

5. A ceramic porous body as claimed in claim 1, wherein said ceramic porous body exhibits two or more peaks in fine pore distribution dV/dr, wherein V: fine pore volume and r: fine pore diameter, obtained by mercury-porosimetry measurements with AUTOSCAN-60 POROSIMETER made by Quanta Chrome Corporation.

6. A method for preparing a ceramic porous body having a structure in which voids each having the same volume as that of a sphere of 10 μm to 500 μm in diameter are formed and said voids are communicated with each other through smaller fine pores, said ceramic porous body having a volume fraction of said voids and said fine pores of from 15% to 60% and being formed of components 70% or higher by volume of which is silicon nitride, said method comprising:

mixing β-type silicon nitride powder with amorphous silicon nitride powder having an average particle size smaller than that of said β-type silicon nitride powder, the mixing ratio by volume of said amorphous silicon nitride powder to the combined volume of said amorphous silicon nitride powder and said β-silicon nitride powder being from 1/99 to 1/2;

adding, as an additive, at least one selected from the group consisting of compounds of the group IIa elements, the group IIIa elements, transition metals, Al and Si in a range of from 1% to 30% by volume in total as their oxides to the silicon nitride powder mixture;

molding the resultant powder mixture; and sintering the molded body in a non-oxidizing atmosphere of at least 0.9 atm at a temperature ranging from 1100° C. to 2000° C.

7. A method for preparing a ceramic porous body having a structure in which voids having the same volume as that of a sphere of 10 μm to 500 μm in diameter are formed and said voids are communicated with each other through smaller fine pores, said ceramic porous body having a volume fraction of said voids and said fine pores of from 15% to 60% and being formed of components 70% or higher by volume of which is silicon nitride, said method comprising:

mixing β-type silicon nitride powder with α-silicon nitride powder having an average particle size smaller than that of said β-type silicon nitride powder, the mixing ratio by volume of said α-silicon nitride powder to the combined volume of said α-silicon nitride powder and said β-silicon nitride powder being from 1/99 to 1/2;

adding, as an additive, at least one selected from the group consisting of compounds of the group IIa elements, the group IIIa elements, transition metals, Al and Si in a range of from 1% to 30% by volume in total as their oxides to the silicon nitride powder mixture;

molding the resultant powder mixture; and sintering the molded body in a non-oxidizing atmosphere of at least 0.9 atm at a temperature ranging from 1300° C. to 1900° C.

8. A method for preparing a ceramic porous body having a structure in which voids each having the same volume as that of a sphere of 10 μm to 500 μm in diameter are formed and said voids are communicated with each other through smaller fine pores, said ceramic porous body having a volume fraction of said voids and said fine pores of from 15% to 60% and being formed of components 70% or higher by volume of which is silicon nitride, said method comprising:

mixing α-silicon nitride powder with amorphous silicon nitride powder having an average particle size smaller than that of said α-type silicon nitride powder, the mixing ratio by volume of said amorphous silicon nitride powder to the combined volume of said amorphous silicon nitride powder and said α-silicon nitride powder being from 1/99 to 1/2;

adding, as an additive, at least one selected from the group consisting of compounds of the group IIa elements, the group IIIa elements, transition metals, Al and Si in a range of from 1% to 30% by volume in total as their oxides to the silicon nitride powder mixture;

molding the resultant powder mixture; and sintering the molded body in a non-oxidizing atmosphere of at least 0.9 atm at a temperature ranging from 1100° C. to 1700° C.

9. A method for preparing a ceramic porous body having a structure in which voids each having the same volume as that of a sphere of 10 μm to 500 μm in diameter are formed and said voids are communicated with each other through smaller fine pores, said ceramic porous body having a volume fraction of said voids and said fine pores of from 15% to 60% and being formed of components 70% or higher by volume of which is silicon nitride, said method comprising:

mixing β-type silicon nitride powder having an average particle size in the range of from 0.01 μm to 1 μm with amorphous silicon nitride powder or α-type silicon nitride powder, both having the same average particle size range as that of said β-type silicon nitride powder, at a mixing ratio by volume of β-type silicon nitride powder: amorphous silicon nitride powder or α-type silicon nitride powder in the range between 1:9 and 9:1 to provide a fine powder mixture;

mixing said fine powder mixture with β-type silicon nitride powder having an average particle size of 1 to 100 μm, the mixing ratio by volume of said fine powder mixture to the combined volume of said fine powder mixture and said coarse β-type silicon nitride powder being from 1/99 to 1/2;

adding, as an additive, at least one selected from the group consisting of compounds of the group IIa elements, the group IIIa elements, transition metals, Al and Si in a range of from 1% to 30% by volume in total as their oxides to the silicon nitride powder mixture;

molding the resultant resultant powder mixture; and sintering the molded body in a non-oxidizing atmosphere of from 0.9 atm to 10 atm at a temperature ranging from 1100° C. to 2000° C.

10. A method for preparing a ceramic porous body having a structure in which voids each having the same volume as that of a sphere of 10 μm to 500 μm in diameter are formed and said voids are communicated with each other through smaller fine pores, said ceramic porous body having a volume fraction of said voids and said fine pores of from 15% to 60% and being formed of components 70% or higher by volume of which is silicon nitride, said method comprising:

mixing two kinds of powders selected from the group consisting of β-type silicon nitride powder, α-type silicon nitride powder and amorphous silicon nitride powder, all having an average particle size in the range of from 0.01 μm to 1 μm, at a mixing ratio by volume of 1:9 to 9:1 to provide a fine powder mixture;

mixing said fine powder mixture with α-type silicon nitride powder having an average particle size of 1 to 100 μm, the mixing ratio by volume of said fine powder mixture to the combined volume of said fine powder mixture and said coarse α-type silicon nitride powder being from 1/99 to 1/2;

adding, as an additive, at least one selected from the group consisting of compounds Of the group IIa elements, the group IIIa elements, transition metals, Al and Si in a range of from 1% to 30% by volume in total as their oxides to the silicon nitride powder mixture;

molding the resultant powder mixture; and sintering the molded body in a non-oxidizing atmosphere of from 0.9 atm to 10 atm at a temperature ranging from 1100° C. to 1700° C.

11. A method for preparing a ceramic porous body as claimed in claim 9, wherein said ceramic porous body is prepared using, instead of said β-type silicon nitride powder having the average size of from 0.01 μm to 1 μm, at least one powder selected from the group consisting of carbides and nitrides of B, Si, Ti, Zr, W, Hf having the same average particle size range as that of said β-type silicon nitride powder in such a proportion that the combined volume of said at least one powder and said additive is not greater than 30% by volume.

12. A method for preparing a ceramic porous body as claimed in claim 10, wherein said ceramic porous body is prepared using, instead of said β-type silicon nitride powder having the average particle size of from 0.01 μm to 1 μm, at least one powder selected from the group consisting of carbides and nitrides of B, Si, Ti, Zr, W, Hf having the same average particle size range as that of said β-type silicon nitride powder in such a proportion that the combined volume of said at least one powder and the additive is not greater than 30% by volume.

* * * * *